United States Patent [19]

Brecht

[11] Patent Number: 4,459,015

[45] Date of Patent: Jul. 10, 1984

[54] INDICIA BEARING LAMINATED CARDS AND APPARATUS AND METHOD FOR PRODUCING INDICIA BEARING LAMINATED CARDS

[76] Inventor: Frederick R. Brecht, 3241 Duncan Ave., Sarasota, Fla. 33579

[21] Appl. No.: 399,431

[22] Filed: Jul. 19, 1982

[51] Int. Cl.³ .................. G03B 17/53; G03B 27/62
[52] U.S. Cl. .................................. 355/46; 354/81; 354/110; 355/64
[58] Field of Search ............ 354/81, 110; 355/40, 355/46, 64

[56] References Cited

U.S. PATENT DOCUMENTS

| | | | |
|---|---|---|---|
| 2,529,905 | 11/1950 | Berssenbrugge | 354/110 X |
| 2,548,213 | 4/1951 | Gittins | 354/110 |
| 3,289,530 | 12/1966 | Samain | 355/46 |
| 3,620,145 | 11/1971 | Clark | 355/46 |
| 3,709,597 | 1/1973 | La Rocca | 355/46 X |
| 4,252,427 | 2/1981 | Brecht et al. | 354/109 |
| 4,259,391 | 3/1981 | Brecht | 428/195 |

Primary Examiner—Marion McCamish
Assistant Examiner—Nancy A. B. Swisher

[57] ABSTRACT

The apparatus for obtaining the microfilm photographic transparency comprises a table supporting a frame in which is disposed a rendition of the general data common to all the members of the group. A slide carrying data specific to a member of the group is displaceable from a position wherein it masks the general data to a position where it unmasks the general data. A first microfilm camera, aligned with the general data frame, is triggered when the slide reaches each end of its stroke, such that the camera takes consecutive exposures of the general data and of the specific data. A second microfilm camera aligned with the slide at the end of its stroke unmasking the general data is triggered when the slide is aligned with its optical axis. Two consecutive microfilm frames exposed by the first camera, after processing, are used to form the card, and the roll of film exposed by the second camera, after processing, forms a specific information data bank for storage purposes. The slide carries a form on which is typewritten or printed a portion of the specific data. The form has appropriate locations for punchable holes unmasking photosensors disposed in the slide for activating illuminated panels providing appropriate specific information data of a legible nature, while the typewritten or printed data on the form is normally non-legible, except under magnification, when reduced to microfilm size.

Alternatively, the form bears first information on a side and second information on a reverse side. The reverse side of the form, placed on a slide having a transparent bottom, is photographed by the second camera disposed below the slide.

8 Claims, 6 Drawing Figures

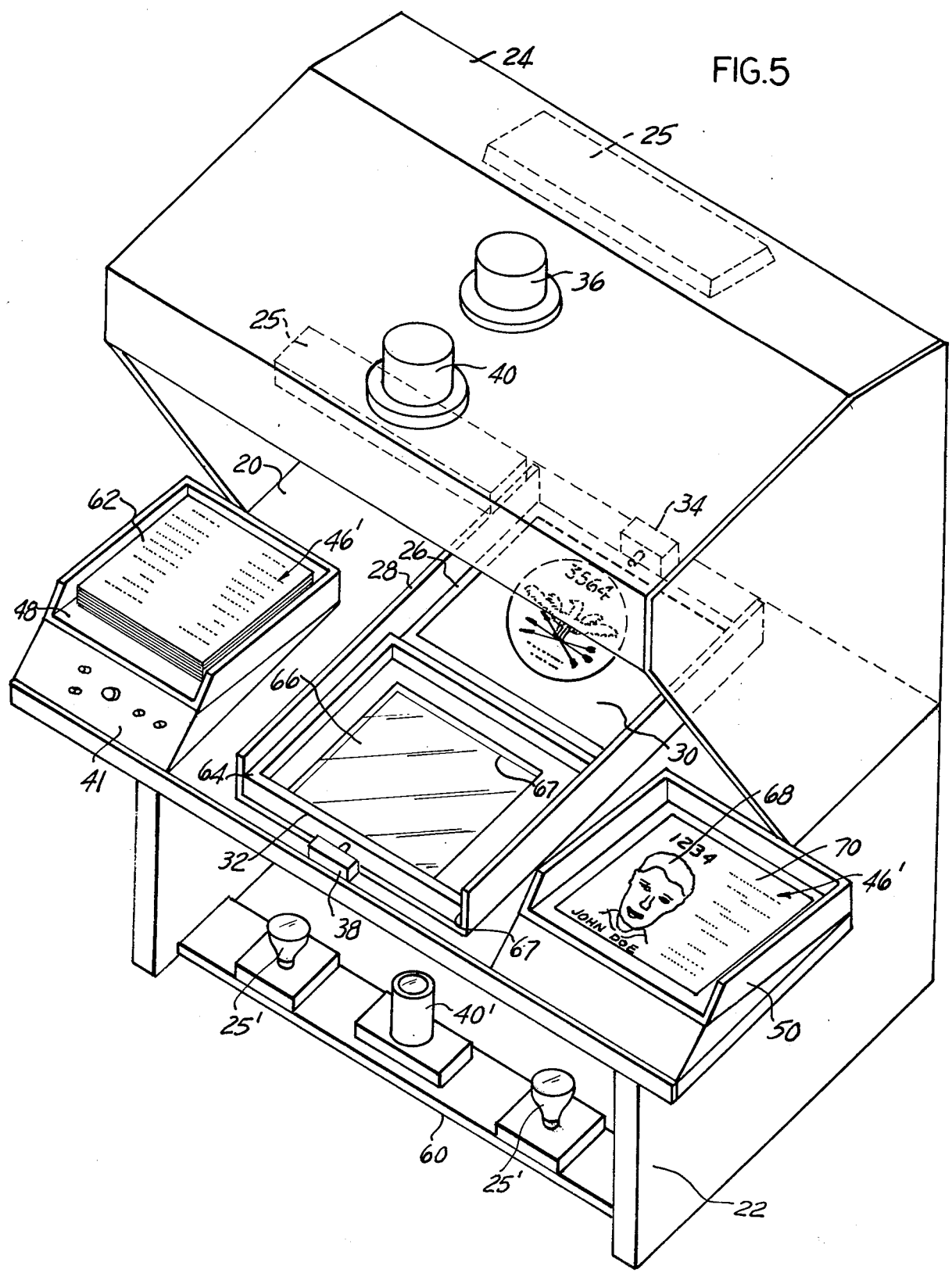

INDICIA BEARING LAMINATED CARDS AND APPARATUS AND METHOD FOR PRODUCING INDICIA BEARING LAMINATED CARDS

CROSS-REFERENCE TO RELATED PATENTS

The present application is related to U.S. Pat. No. 4,259,391 for Indicia Bearing Plastic Laminate and Method of Producing Same, and U.S. Pat. No. 4,252,427 for Mechanism and Method of Producing Indicia Bearing Plastic Laminated Cards, issued, respectively, Mar. 31, 1981 and Feb. 24, 1981.

BACKGROUND OF THE INVENTION

Indicia bearing plastic cards for personal identification purposes bearing individualized data such as medical information, name, address, and charge account number, for example, are well known. Usually, the card provides information embossed, typed, or printed on a 50×75 mm cardboard or plastic card. As described in U.S. Pat. No. 4,259,391, there are substantial disadvantages associated with the use of such cards. Depending on the form chosen, there is a great risk that there will be typing inaccuracies, the cost of equipment, material and labor is fairly high, and the risk of fraud great, yet only a small amount of information may usually be stored. Additionally, and more importantly, when a cardboard base or plastic card is employed, the resulting object is essentially opaque, and therefore reading by means of a microfilm viewer is impossible.

The improvement disclosed in U.S. Pat. No. 4,259,391 consists of eliminating the cardboard base or plastic card and, instead, heat-sealing two frames of microfilm adjacent to each other between two sheets of transparent laminate so as to form a flatter, thinner, cheaper and transparent wallet-size card, substantially the same in size as a conventional credit card, which may be read with the naked eye in those portions using extremely large prints, and by means of a microfilm reader elsewhere. Such cards may be used to store credit information, security clearances, medical information, or any other type of data that may be too bulky to carry around in other than microfilm form, together with more general information such as the name and/or trademark, for example, of the named parties, an employer, an insurer, or a bank.

SUMMARY OF THE PRESENT INVENTION

The present invention relates to a method and apparatus for rapidly making essentially transparent information bearing plastic laminated cards of wallet-size, for example 85×50 mm to 70×35 mm, and more particularly for making such cards containing some generalized data applicable to several parties and containing other individualized data applicable only to a specifically named person. The method of the present invention comprises sequentially photographing a display of generalized information and a display of individualized information which may be stored on an opaque or transparent sheet but, preferably, is on a long roll of microfilm containing, on each frame, the individualized information pertaining to one of several parties. The generalized information may also be on either an opaque or a transparent sheet or on film, but preferably is on a photographic slide transparency.

Use of photographic film to store information allows recording the individualized information in a compact form, facilitates efficient mass production of the cards, automatically produces a positive photographic transparency and creates a permanent record. In addition, the apparatus and method of the present invention provides permanent record, for filing and storing purpose, of the information contained in each card.

These and other objects and advantages of the present invention will become apparent to those skilled in the art when the detailed descripion, wherein like reference numerals refer to like components throughout, is read in conjunction with the accompanying drawing.

BRIEF DESCRIPTION OF THE DRAWING

FIG. 5 is a view similar to FIG. 2 but showing a modification thereof.

DETAILED DESCRIPTION OF THE PREFERRED EMBODIMENT

Figure 1:
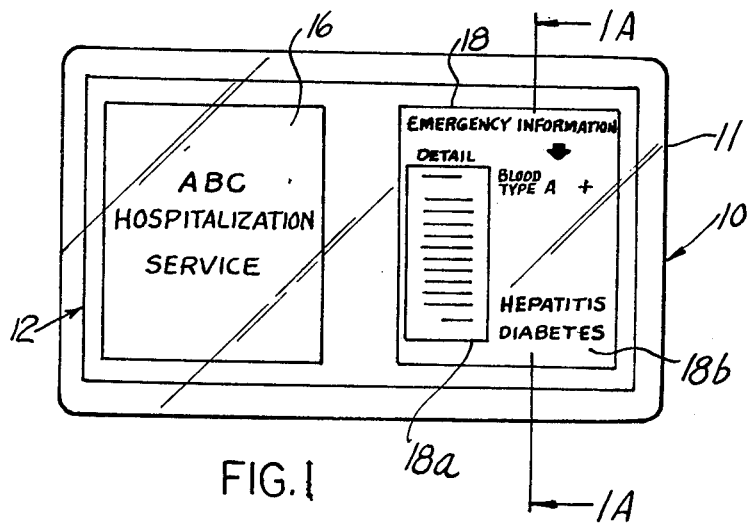
FIG. 1 is an example of an identification and information card as obtained by the apparatus and method of the present invention.
Figure 1A:
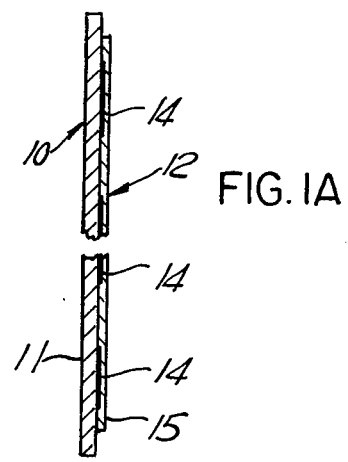
FIG. 1A is a section thereof through line 1a—1a of FIG. 1.

Referring to the drawing and more particularly to FIG. 1, there is illustrated an example of a wallet-size identification and information card 10 which may be substantially as disclosed and claimed in prior U.S. Pat. No. 4,259,391, as consisting essentially of a length of processed microfilm 12 laminated between two transparent sheets of plastic, such as Mylar, each bonded to the other at its edge. Alternatively, the card 10 is, preferably, made of a single sheet 11 of relatively stiff transparent plastic bonded preferably by heat-fusing to a length of microfilm 12, as best shown, in an exaggerated manner with respect to thickness, at FIG. 1A. During bonding, the processed photographic emulsion 14, on the microfilm support 15, also becomes adhered to the surface of the sheet 11 of plastic, such that the card 10 is actually tamper-proof as any attempt to separate the sheet 11 of plastic from the emulsion side of the length of microfilm 12 will leave indelible marks of tampering.

The length of microfilm 12 may be in two separate pieces but is preferably in a single piece comprising a portion 16 indicating, for example, the membership of the card bearer in a particular group, such as an insurance group, an association, a club and the like. A second portion 18 of the length of microfilm 12 bears information data specific to a particular person. In the example of card 10 illustrated, FIG. 1, a portion of the specific information 18, as shown at 18a, is non-legible with the naked eye, while another portion 18b is readily legible with the naked eye. The example of card 10 illustrated is specifically addressed to a medical information, identification and alert card. The readily legible specific information 18b alerts to the fact that the card bearer is subject to particular medical problems, for example, and may have some additional readily legible information as, for instance, blood type and Rh factor. The non-legible portion 18a of the specific data information portion 18 of the card 10 may be addressed, for example, to the medical history of the particular person, and the information contained in that portion 18a is visible only by viewing the card 10 under magnification such as by means of an appropriate microfilm viewer, for example.

The membership and data information card 10 may be made by means of the apparatus disclosed in U.S. Pat. No. 4,252,427 but, preferably, is obtained by means of the apparatus of the present invention which, in addition to providing the length of microfilm 12 of the identification and information laminated card 10 provides a permanent, classified, or classifiable, record of the pertinent information contained in the data information portion 18 of the card.

Figure 2:
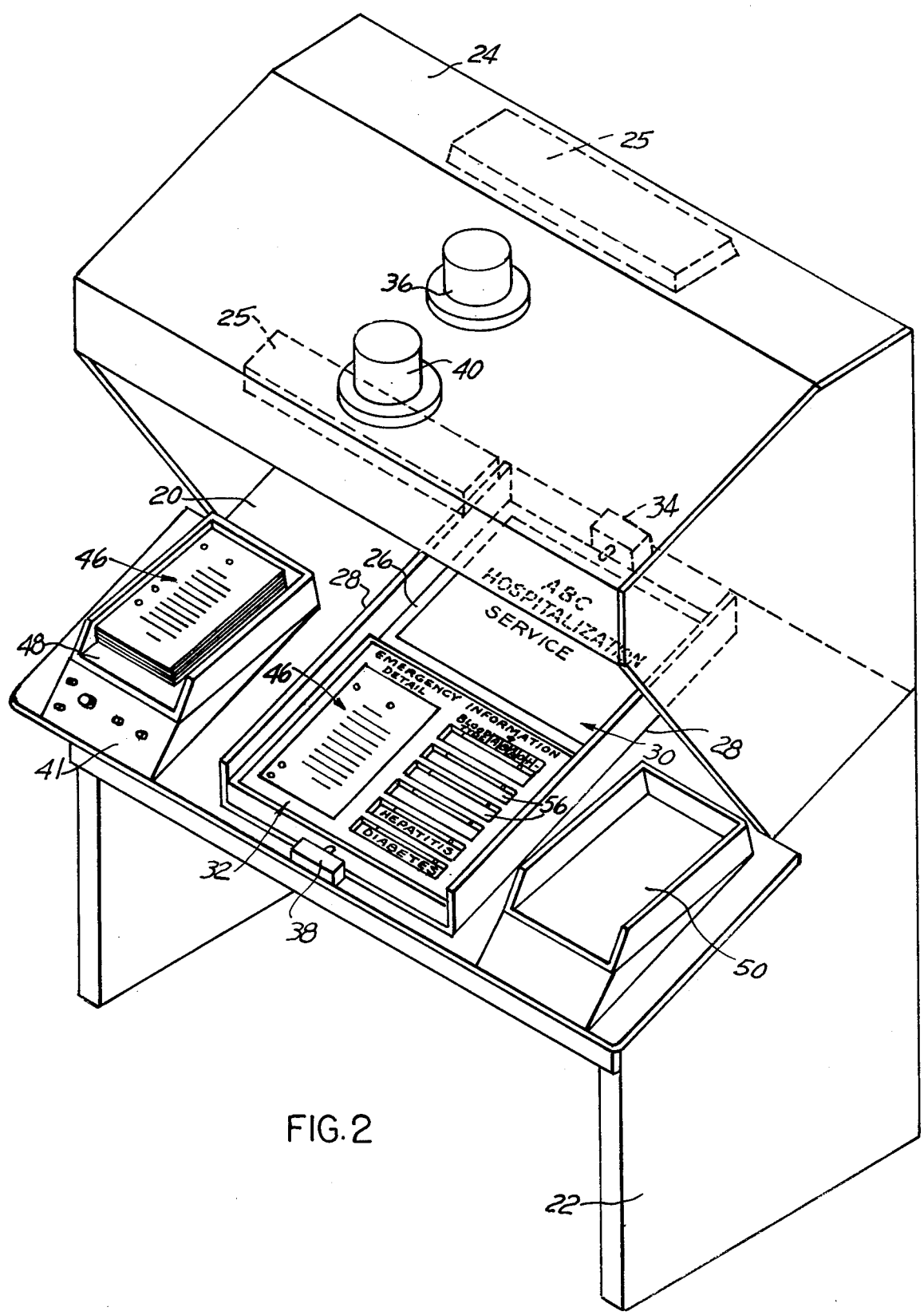
FIG. 2 is a schematic perspective view of an example of apparatus for practicing the method of the present invention.

As shown at FIG. 2, the apparatus for practicing the invention comprises a table 20 supported from the ground by legs 22 which, in addition, also support a hood 24 disposed a predetermined distance above the table 20. An appropriate lighting system 25 is mounted under the hood 24. The lighting system 25 may consist of fluorescent lamps mounted in appropriate reflectors or high intensity incandescent lamps. The lighting system 25 illuminates the surface of the table 20, and more particularly the center portion of the table.

The center portion of the table 20 supports a framing jig 26 disposed between a pair of side rails or guides 28. At the rear portion of the framing jig 26 is permanently installed a carrier 30 of an enlarged rendition of general information forming the portion 16 of the identification and information card 10 of FIG. 1. A slide 32 is mounted in the framing jig 26 between the side walls or guides 28 and is manually, or automatically, displaceable from the position, shown in FIG. 2, proximate to the front of the table 20 and away from the general information data carrier 30 to a position whereby it is superimposed on and masking the general data information carrier 30. A limit switch 34 is tripped when the slide 32 reaches the end of its rearward travel, superimposed over the general data information carrier 30. The limit switch 34, when tripped, operates a microfilm camera 36 mounted in the hood 24 above the general data carrier 30 and optically aligned therewith, such that when the slide 32 trips the limit switch 34 the microfilm camera 36 takes an exposure of the information member placed on the slide 32. The information member on the slide 32 is of the type shown at the information data portion 18 of the identification and information data card of FIG. 1.

A second limit switch 38 is mounted at the front of the framing jig 26 and is triggered by the slide 32 when it reaches the end of its forward travel in the position illustrated at FIG. 2. When triggered, the limit switch 38 operates both the microfilm camera 36 and a second microfilm camera 40, also mounted in the hood 24, but optically aligned with the slide 32 in the position shown at FIG. 2. The microfilm camera 36 therefore makes an exposure of the now visible information data of a general matter on the stationary carrier 30, while the camera 40 makes an exposure of the specific information data on the slide 32. A control panel 41 provides the operator of the apparatus with, for example, a master switch, control of the intensity of the lighting system 25, and manual operation of the microfilm cameras 36 and 40.

Figure 3:
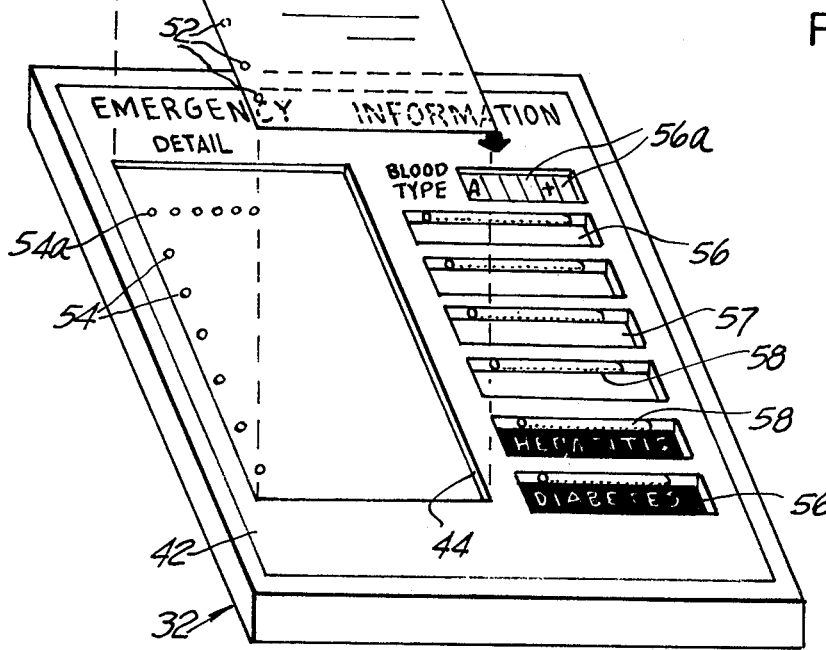
FIG. 3 is a perspective schematic view of a portion of the apparatus of FIG. 2.

The slide 32, as best shown in greater detail at FIG. 3, has a portion 42 which, for example, may be slightly recessed such as to form a rectangular border 44 for a sheet paper or cardboard form 46 on which has been printed or typewritten specific data information 47 corresponding to the portion 18a of the specific information data portion 18 of the card 10, FIG. 1. The form 46, after being manually or automatically removed from a hopper 48, FIG. 2, is placed in the recessed portion 42 of the slide 32, the border 44 maintaining the form 46 indexed in an appropriate position, prior to displacing the slide 32 rearwardly, under the microfilm camera 36 and, after the slide 32 has been returned to its foremost position, thus actuating the limit switch 38, the form 46 is automatically or manually removed and placed in a second hopper 50 on the table on the other side of the framing jig 26.

In addition to bearing the specific data information 47 the form 46 has a plurality of punchable hole areas 52, for example, in a vertical row on one marginal side of the form. In the example illustrated, there are six such hole areas in the form 46, each hole punched at a particular area 52 representing a pertinent medical alert for the particular individual to whom the card 10 of FIG. 1 has been issued.

The recessed portion 42 of the slide 32 has the same number of light sensors 54 as there are punchable hole areas 52 in the form 46, the light sensors 54 being also disposed in a vertical row on a marginal side of the slide recessed portion 42. After the form 36 is placed in the recessed portion 42 of the slide 32, all the light sensors 54 are masked by the form 46 except for those registering with a hole punched in the form 46 unmasking an appropriate one of the light sensors 54, such that appropriate light sensors are exposed to the light emitted by the lighting system 25 mounted under the hood 24 of the apparatus of FIG. 2. The slide 32 is provided on its other side with a portion forming a plurality of medical alert panels 56, each capable of being activated by one of the light sensors 54. The appropriate medical alert panel 56 which is activated corresponds to one of the light sensors 54 which is exposed to light as a result of an appropriate hole having been punched in the form 46 at the appropriate punchable hole area 52.

Each of the medical alert panels 56 may take the form of a rectangular open-top box or recess 57, with appropriate white lettering, for example, on a black matte background representing a particular medical problem of the card carrier, such as, for instance, "hepatitis" and "diabetes". Each of the open top boxes or recesses 57 is provided with an elongated light bulb 58, or a plurality of light bulbs, provided with appropriate reflectors projecting the light on the bottom surface of the open-top boxes or recesses, mounted on a longitudinal wall thereof and illuminating the lettering upon activation. Alternatively, each panel 56 may take the form of a stencil-like plate perforated according to the desired caption, and illuminated from below by way of an elongated light bulb or a plurality of light bulbs or light-emitting diodes. One of the medical alert panels, for example the upper panel, may be used for indicating the blood type of the card bearer, and his or her Rh factor thus requiring, for example, six sub-panels 56a with appropriate lettering (A, B, AB, O, +, −) each provided with a separate illuminating device, and each individually activated by one of a plurality of light sensors 54a, the form 46 having a corresponding horizontal row of punchable hole areas 52a to unmask any appropriate light sensor 54a to display the appropriate blood information by way of the appropriate illuminated sub-panel 56a.

Figure 4:
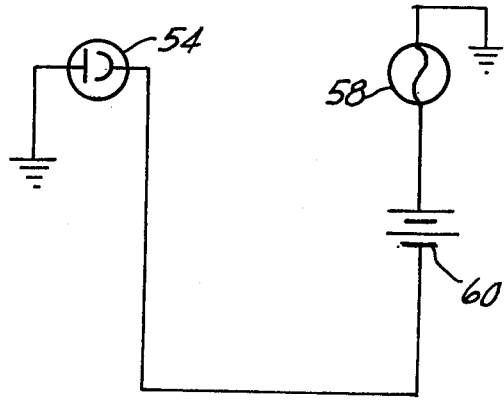
FIG. 4 is an electrical schematic of the information data triggering device forming part of the apparatus of the present invention.

As schematically illustrated at FIG. 4, each light sensor 54 of the slide 32 is connected to a panel illuminating light 58 through a power supply 60. The light sensors 54 may simply take the form of photoconductive photocells.

It will be readily apparent to those skilled in the art that the detailed medical information 47 on the form 46 which is pertinent to an individual card bearer corresponds to the non-legible information portion 18a of the card 10 of FIG. 1. This information can be read only by using a microfilm viewer. The appropriate holes punched in the form 46 activate the appropriate medical alert panels which form the legible portion 18b of the card 10, FIG. 1.

It will also be readily apparent that each pair of microfilm frames taken by the rear microfilm camera 36, FIG. 2, forms the length of microfilm 12 including both the portion 16 of the card 10 indicating membership of the card bearer in a particular group and the portion 18 of the card 10 providing the legible portion 18b and the non-legible, with the naked eye, portion 18a of specific information data. The microfilm is cut, after processing, such that each length of microfilm 12 bears the appropriate pair of consecutive frames, prior to laminating the length of microfilm 12 for making the card 10, FIG. 1. The second, or front, microfilm camera 40 takes a series of frames that only correspond to the specific information data 18 of the card 10. After processing, the roll of microfilm exposed by the camera 40 is stored as a specific data bank for all the individuals in the group. Preferably, the rear camera 36 is loaded with 35 mm film, while the front camera is loaded with 16 mm film.

Although the invention has been disclosed with particular emphasis placed on obtaining, by the method and apparatus of the invention, a medical information and identification card, it will be appreciated that the principles of the invention are subject to many applications where it is desired to obtain a tamper-proof wallet-size card bearing information data, portion of which is readily visible to the naked eye and portion of which is visible only by placing the card in an appropriate magnification viewer and the like.

It will be also apparent to those skilled in the art that in order to obtain a negative photographic transparency in the form of the length 12 of microfilm of FIG. 1, having dark lettering, the lettering of the general information carrier 30, FIG. 2, is, for example, white on dark matte background, and the lettering of visible information on the slide 32 is also white on dark non-reflective background, as more specifically shown at FIG. 3 with regard to the two lower lit panels 56, and contrary to the lettering representation at FIGS. 2 and 3 of dark lettering over a light background, shown as such for the sake of convenience and simplicity rather than realism.

It will also be further appreciated by those skilled in the art that the microfilm cameras 36 and 40, rather than being disposed on a hood, such as the hood 24, above the table 20 may be disposed under the table 20, and the arrangement of the general data carrier 30 and of the specific data slide 32 arranged such that the information being photographed faces downwardly rather than upwardly. Alternatively, one or more additional microfilm cameras may be disposed under the table 20 and the form carried by the slide 32 may bear data information on its reverse side with the table 20 and the slide 32 each provided with an appropriate opening such that a microfilm camera disposed below the table 20 may be able to record a frame of the information on the reverse side of the form.

Such an arrangement as shown at FIG. 5 illustrating a microfilm camera 40' supported below the table 20 by a platform 60 on which are also mounted appropriate lights 25'. The camera 40' is actuated by the limit switch 38 when the slide 32 reaches its forwardmost position, such that a frame is exposed by the camera 40' of the information 62 on the reverse side of a form 46'. The form 46' is removably disposed in a framing recess 64 in the slide 32, provided at its bottom with a transparent window 66, a corresponding opening or transparent portion 67 being formed in the table 20 in alignment with the slide transparent window 66 when the slide occupies the position illustrated.

In addition to carrying information data 62 on its reverse side, the form 46' illustrated has, on its front side, for example a photograph of an individual, as shown at 68, the name of the individual, an identification number and some indentification information, as shown at 70, all legible with the naked eye on the microfilm transparency exposed by the rear camera 36, as a result of the limit switch 34 being tripped when the slide 32 is disposed in its rearmost position over the general information carrier 30 with the form 46' disposed in the recess 64 in the slide 32. When the slide 32 is displaced to its forward position, thus tripping the limit switch 38, both microfilm cameras 36 and 40' are actuated, such that the microfilm camera 36 takes a frame of the general information data on the general information carrier 30, while the camera 40', disposed below the table 20, takes a frame of the information data 62 on the reverse side of the form 46', for data storage purposes.

In this manner, an identification card of a member of a group is obtained, after processing of the film in the camera 36, by way of two consecutive frames of film, while the information 62 on the reverse side of the form 46' does not appear on the identification card but is recorded on the film in the camera 40'.

Having thus described the present invention by way of specific examples thereof, modifications whereof will be apparent to those skilled in the art, what is claimed as new is as follows:

1. An apparatus for mass producing microfilm transparencies for making substantially transparent information bearing plastic cards containing both individual and general information and for simultaneously producing a microfilm record of said individual information, said apparatus comprising a stationary information display of said general information, a movable information display of said individual information, a first microfilm camera optically aligned with said stationary display, means for displacing said movable display to a first position over said stationary display for masking said stationary display, means for singly operating said first microfilm camera for taking a photographic frame of said movable display when disposed over and masking said stationary display, means for displacing said movable display to a second position away from and unmasking said stationary display, a second microfilm camera optically aligned with said movable display when at said second position, and means for simultaneously operating both said first and second cameras when said movable display is at said second position, whereby said first camera takes consecutive frames of said stationary and movable displays for producing said cards and said second camera takes consecutive frames of said movable display for producing said microfilm record.

2. The apparatus of claim 1 wherein said movable display comprises individual information which is legible by the naked eye and information which is non-legible by the naked eye on said frames of microfilm.

3. The apparatus of claim 2 wherein said non-legible information is information printed on a removable form, at least a portion of said legible information comprises at least one prearranged information display and said form has areas for punching apertures according to a predetermined code for activating at least one of said prearranged information displays.

4. The apparatus of claim 2 wherein said legible individual information is of a medical alert character.

5. The apparatus of claim 1 wherein said first camera is a 35 mm camera and said second camera is a 16 mm camera.

6. The apparatus of claim 1 wherein said movable display is on a slide linearly displaceable from said first position to said second position.

7. The apparatus of claim 6 further comprising first limit switch means for operating said first camera upon positioning said slide at said first position and second limit switch means for operating simultaneously said first and second cameras upon positioning said slide at said second position.

8. The apparatus of claim 1 wherein said movable display comprises first information on one side and second information on a reverse side and said second camera takes consecutive frames of said second information.

* * * * *